Nov. 2, 1948. H. N. BOURQUE 2,453,083
TOOL HOLDING ATTACHMENT FOR MACHINE TOOL TURRETS
Filed Sept. 8, 1944 2 Sheets-Sheet 1
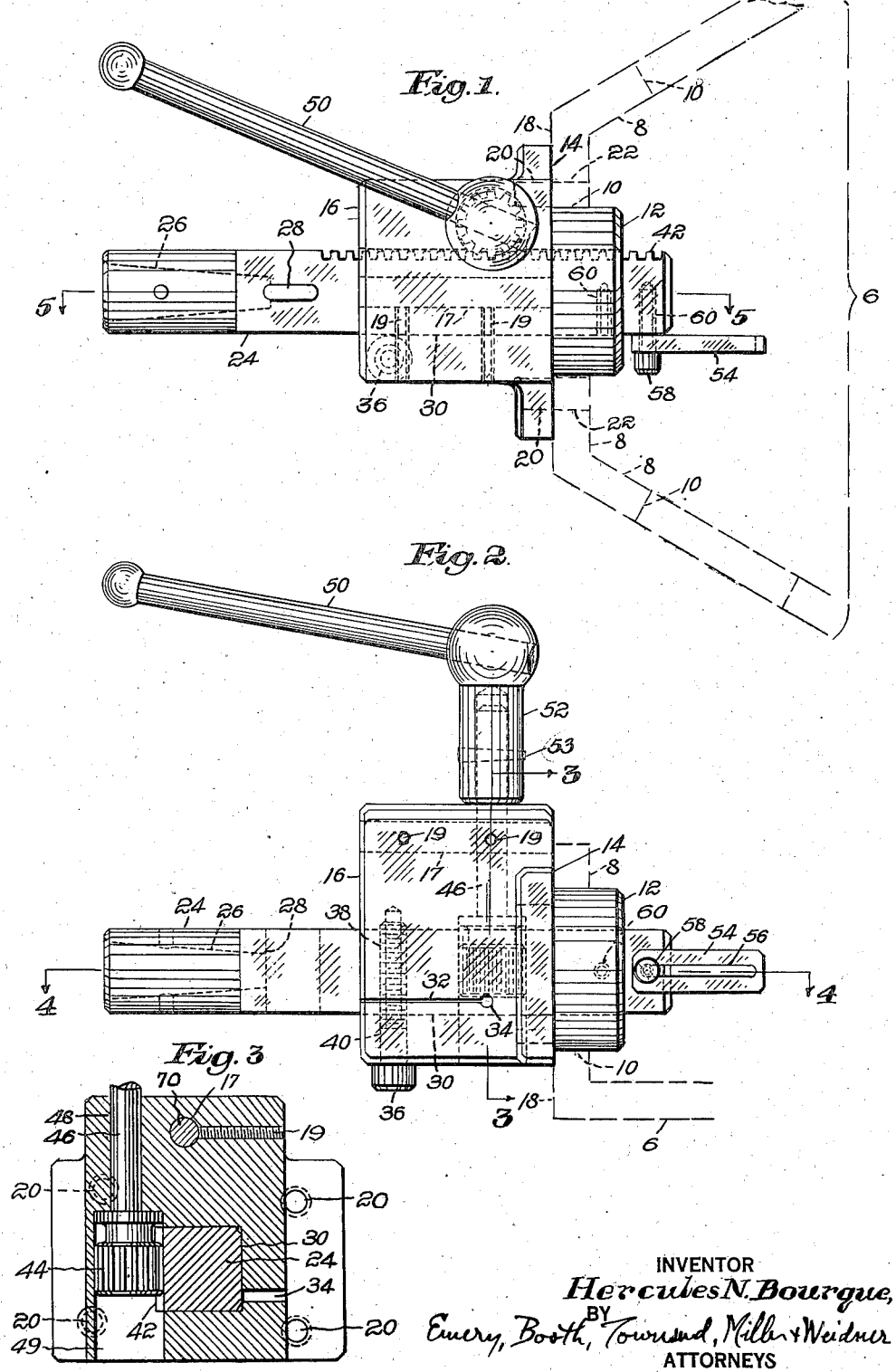
INVENTOR
*Hercules N. Bourque,*
BY *Emery, Booth, Townsend, Miller & Weidner*
ATTORNEYS Nov. 2, 1948.    H. N. BOURQUE    2,453,083
TOOL HOLDING ATTACHMENT FOR MACHINE TOOL TURRETS
Filed Sept. 8, 1944    2 Sheets-Sheet 2
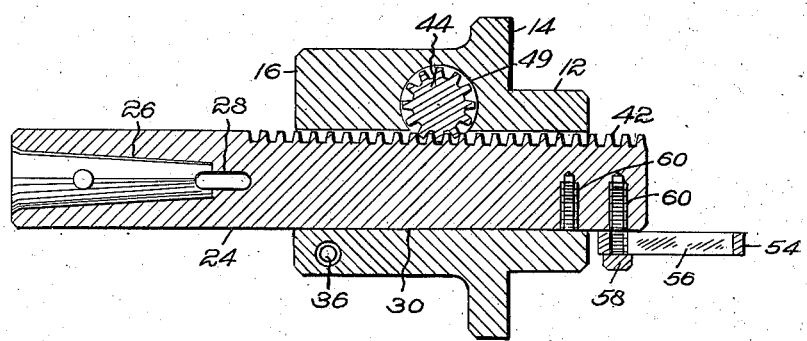
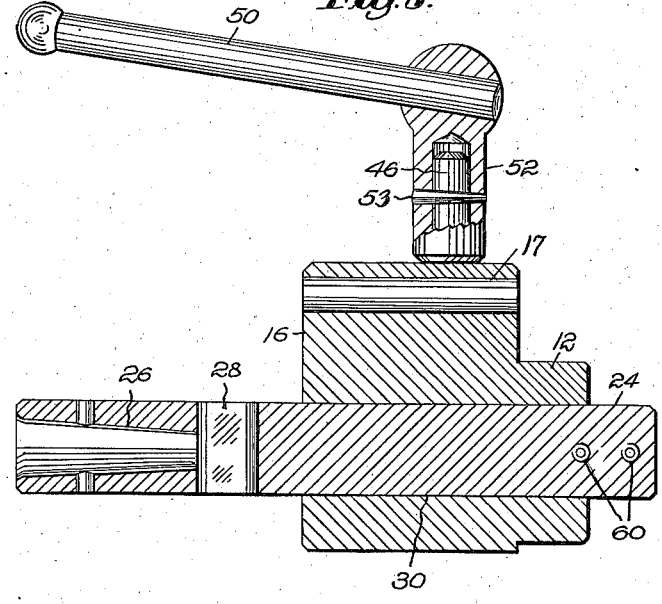
INVENTOR
*Hercules N. Bourque*
BY
*Emery, Booth, Townsend, Miller & Weidner*
ATTORNEY Patented Nov. 2, 1948

2,453,083

UNITED STATES PATENT OFFICE 2,453,083

TOOLHOLDING ATTACHMENT FOR MACHINE TOOL TURRETS

Hercules N. Bourque, Hudson, Mass.

Application September 8, 1944, Serial No. 553,175

5 Claims. (Cl. 29—57)

1

This invention relates to a novel and improved attachment to be applied to the turret of a machine tool such as a lathe to enable light operations such as thread cutting, reaming, and drilling to be carried out without moving the turret itself toward and from the work. The attachment, being small and light and operating independently of the turret mechanism, is sufficiently sensitive for threading operations and the hand which operates its actuator can get the "feel" of the thread-cutting. A feature of the attachment is an arrangement to prevent rotation of the tool-holder about the axis of the tool.

The invention will best be understood by reference to the following description of one specific embodiment of the invention illustrated in the drawings, while its scope will be pointed out more particularly in the appended claims.

In the drawings:

Fig. 1 is a plan of a tool-holding attachment embodying the invention;

Fig. 2 is a side elevation of the same;

Fig. 3 is a vertical sectional view on line 3—3 of Fig. 2;

Fig. 4 is a horizontal sectional view on line 4—4 of Fig. 2; and

Fig. 5 is a vertical sectional view partly on line 5—5 of Fig. 1.

Referring to the drawings and to the embodiment of the invention illustrated therein by way of example, and having reference at first more particularly to Figs. 1 and 2, there is shown a tool-holder attachment intended for application to a turret 6, herein a hollow hexagon, shown in broken lines, having six vertical walls 8 with circular openings 10 to receive a cylindrical boss 12 projecting from a flat face 14 on the guide-block 16 which rests against a corresponding face 18 of the turret 6, and is suitably secured to the latter as by providing the guide-block with tapped holes 20 (see Fig. 3) to receive cap-screws (not shown) passed through corresponding holes 22 (see Fig. 1) in the wall 8 of the turret.

The guide-block 16 provides support and guidance for a tool-holder 24 (see Fig. 1) suitably constructed to receive a tool such as a tap, die, reamer, drill, or other tool, as by providing the tool-holder with a tapered socket 26 having at its inner end a transverse slot 28 for the insertion of a tapered drift-pin (not shown) to drive the tapered shank of the tool out of the socket. The tool-holder is a slide movable lengthwise through and guided by the guide-block, the latter to this end being provided with a passage 30 extending axially through the boss 12 and through the body

2 of the guide-block. Rotation of the tool-holder within the guide passage under the influence of the rotation of the work is prevented by providing the guide-block and the tool-holder with cooperative means such as by making the tool-holder and the guide passage polygonal (herein square) in cross-section (see Fig. 3) for a suitable portion of its length.

To insure a snug working fit between the tool-holding slide and guide-block, the latter has appropriate means providing for transverse contraction of the guide-passage (see Figs. 2 and 3) as by providing the guide-block with a slot 32, terminating in a drilled hole 34, and by providing an adjusting screw 36 threaded into the guide-block at one side of the slot, as at 38, and turning freely in the guide-block at the other side of the slot, as at 40. It follows that there can be no chatter of the tool due to looseness of the tool-holding slide in the guide-block.

Manual operation of the tool-holder to slide the same through the guide-block to carry the tool toward and from the work is conveniently accomplished as by a rack and pinion arrangement now to be described, reference being had to Fig. 3. To this end, the slide is provided with gear teeth 42 constituting a rack meshing with the teeth of a pinion 44 suitably formed on a shaft 46 turning in a bearing 48 in the guide-block. The pinion turns in a cylindrical chamber 49 coaxial with the bearing 48 and communicating with and intersecting the guide passage 30 for the slide 24. To the upper end of the shaft 46 there is secured an appropriate handle 50 for manual operation of the tool, the one shown comprising a collar 52 suitably secured as by a tapered pin 53 to the shaft 46. Movement of the tool toward the work may be limited by an appropriate adjustable stop such as a plate 54 provided with a slot 56 to receive a screw 58 threaded into one of a series of holes 60 tapped in the slide 24, the arrangement being such that the plate strikes the end of the boss 12, and the point in the movement of the slide when the latter is stopped is determined by adjustment of the plate.

For certain jobs, as for example where a relatively slender elongated tool is required or the work material is extremely hard, an adjustable and demountable steadying bar, rest or support may be installed on the fixture, having a collar or other means for engaging either the tool or the work. For this purpose the guide-block 16 is shown provided with a recess or passage 17 paralleling the axis of the tool-holder 24, the block having one or more tap holes 19 communicating with such passage, for receiving set screws to secure the steadying bar, the latter seen in section at 70 in Fig. 3.

The described attachment is well suited to light work such as drilling, reaming, and threading because it is sensitive and responsive to the hand which can feel the action on the work, because there can be no chattering of the tool due to looseness of the tool-carrying slide, and because no movement of the turret itself is required to perform these light operations.

The advantages of the attachment will therefore be evident.

Having thus described one embodiment of the invention, what I claim is:

1. In a tool-holding attachment for a turret of a machine tool, the combination of a guide-block having a face to be placed against a face of the turret and a boss to be fitted into an opening of the turret to locate said guide-block with reference to said turret, said guide-block having a tool-carrying slide passage extending through said boss and through the body of said guide-block, said guide-block having a chamber intersecting said passage and having a bearing coaxial with said chamber, a tool-carrying slide arranged to slide lengthwise within said passage and having at the outer end a receiving formation for the tool, said slide having gear teeth constituting a rack extending into said chamber, a shaft mounted for rotation in said bearing and having a pinion within said chamber meshing with said rack, and a handle secured to said shaft for manual rotation of the latter and consequent sliding of said slide through said boss.

2. In a tool-holding attachment for a turret of a machine tool, the combination of a guide-block having a face to be placed against a face of the turret and a boss to be fitted into an opening of the turret to locate said guide-block with reference to said turret, said guide-block having a tool-carrying slide passage extending through said boss and through the body of said guide-block, said guide-block having a chamber intersecting said passage and having a bearing coaxial with said chamber, a tool-carrying slide arranged to slide lengthwise within said passage and having at the outer end a receiving formation for a tool, said slide having gear teeth constituting a rack extending into said chamber, said slide and said guide-block having cooperative means to resist rotation of said slide about a longitudinal axis of said slide, a shaft mounted for rotation in said bearing and having a pinion within said chamber meshing with said rack, and a handle secured to said shaft for manual rotation of the latter and consequent sliding of said slide through said boss.

3. In a tool-holding attachment for a turret of a machine tool, the combination of a guide-block having a face to be placed against a face of the turret and a boss to be fitted into an opening of the turret to locate said guide-block with reference to said turret, said guide-block having a tool-carrying slide passage extending through said boss and through the body of said guide-block, said guide-block having a chamber intersecting said passage and having a bearing coaxial with said chamber, a tool-carrying slide arranged to slide lengthwise within said passage and having at the outer end a receiving formation for a tool, said slide having gear teeth constituting a rack extending into said chamber, said slide and said passage being polygonal in cross-section to prevent rotation of said slide about a longitudinal axis of said slide, a shaft mounted for rotation in said bearing and having a pinion within said chamber meshing with said rack, and a handle secured to said shaft for manual rotation of the latter and consequent sliding of said slide through said boss.

4. In a tool-holding attachment for a turret of a machine tool, the combination of a guide-block having a face to be placed against a face of the turret and a boss to be fitted into an opening of the turret to locate said guide-block with reference to said turret, said guide-block having a tool-carrying slide passage extending through said boss and through the body of said guide-block, said guide-block having a chamber intersecting said passage and having a bearing coaxial with said chamber, a tool-carrying slide arranged to slide lengthwise within said passage and having at the outer end a receiving formation for a tool, said guide-block having means providing for transverse contraction of said passage, said slide having gear teeth constituting a rack extending into said chamber, a shaft mounted for rotation in said bearing and having a pinion within said chamber meshing with said rack, and a handle secured to said shaft for manual rotation of the latter and consequent sliding of said slide through said boss.

5. In a tool-holding attachment for a turret of a machine tool, the combination of a guide-block having a face to be placed against a face of the turret and a boss to be fitted into an opening of the turret to locate said guide-block with reference to said turret said guide-block having a tool-carrying slide passage extending through said boss and through the body of said guide-block, said guide-block having a chamber intersecting said passage and having a bearing coaxial with said chamber, a tool-carrying slide arranged to slide lengthwise within said passage and having at the outer end a receiving formation for a tool, said guide-block being provided with a slot extending into said passage and rendering the same contractible about said slide, a screw threaded into said guide-block at one side of said slot and turning freely in said block at the other side of said slot to reduce the width of said slot and the corresponding width of said passage, said slide having gear teeth constituting a rack extending into said chamber, a shaft mounted for rotation in said bearing and having a pinion within said chamber meshing with said rack, and a handle secured to said shaft for manual rotation of the latter and consequent sliding of said slide through said boss.

HERCULES N. BOURQUE.

REFERENCES CITED

The following references are of record in the file of this patent:

UNITED STATES PATENTS

| Number | Name | Date |
|---|---|---|
| 1,000,011 | Johnson et al. | Aug. 8, 1911 |
| 1,522,124 | Hoisington | Jan. 6, 1925 |
| 1,602,243 | Nagle | Oct. 5, 1926 |
| 1,677,131 | Cole et al. | July 17, 1928 |
| 1,704,957 | Tyden | Mar. 12, 1929 |
| 1,829,215 | Fox | Oct. 27, 1931 |
| 2,110,537 | Tautz | Mar. 8, 1938 |
| 2,341,051 | Lustrik | Feb. 8, 1944 |
| 2,360,942 | Ellerstein | Oct. 24, 1944 |